United States Patent [19]

Johansson

[11] Patent Number: 4,646,607
[45] Date of Patent: Mar. 3, 1987

[54] ANNULAR SAW BLADE

[75] Inventor: Mats A. Johansson, Forshaga, Sweden

[73] Assignee: M. J. Maskiner Aktiebolag, Forshaga, Sweden

[21] Appl. No.: 604,935

[22] Filed: Apr. 27, 1984

Related U.S. Application Data

[62] Division of Ser. No. 340,778, Jan. 19, 1982, Pat. No. 4,472,880.

[30] Foreign Application Priority Data

Mar. 20, 1981 [SE] Sweden ................................ 8101776

[51] Int. Cl.$^4$ ........................ B23D 57/00; B27D 33/02
[52] U.S. Cl. ........................................ 83/853; 30/389
[58] Field of Search ................... 30/389, 347; 83/835, 83/854, 676, 837–853, 855; 125/15; 51/206 R

[56] References Cited

U.S. PATENT DOCUMENTS 3,930,310  1/1976  Santilli .................................. 30/389
4,316,328  2/1982  Duggan et al. ...................... 30/389

Primary Examiner—Douglas D. Watts
Attorney, Agent, or Firm—Murray and Whisenhunt

[57] ABSTRACT

In an annular saw, that is to say a circular saw with an annular saw blade, the saw blade is adapted to rotate about an imaginary center axis by being driven via a drive shaft which is parallel to the center axis and has a fulcrum between the annular saw blade and its center. Mounted on the drive shaft (27) are two drive rollers (25, 26), of which the adjacent surfaces (41, 42) are bevelled at a certain bevel angle so that the rollers comprise drive surfaces which, between them, form a wedge-shaped groove (40). The two lateral surfaces of the saw blade (8) are bevelled in a corresponding manner within a region (13) close to the inner edge (15) of the saw blade, the bevel angle being the same as for the drive rollers, the bevelled edge portion of the annular saw blade being clamped between the bevelled drive surfaces of the drive rollers in the wedge-shaped groove. The invention also relates to the annular saw blade, the inner edge portion (13) of which is symmetricaly bevelled to comprise encircling bevel surfaces (14).

3 Claims, 4 Drawing Figures

ANNULAR SAW BLADE

This application is a division of Ser. No. 340,778, filed 1/19/82, now U.S. Pat. No. 4,472,880.

TECHNICAL FIELD

The invention relates to an annular saw blade and to an annular saw, that is to say a circular saw with an annular saw blade. More specifically, the invention relates to an annular saw blade and to an annular saw where the annular saw blade is adapted to rotate about an imaginary central axis by being driven via a drive shaft which is parallel to the central axis and has a fulcrum between the annular saw blade and its centre.

BACKGROUND ART

For the rotation of saw blades in annular saws, either gear-wheel drive or friction drive is used. Drive systems which are based on the former principle are described, for example, in the U.S. Pat. Nos. 2,804,105, 2,972,363, 3,373,489, and 3,808,685. Friction transmissions for the drive of annular saw blades are described, for example, in the U.S. Pat. Nos. 3,221,783, 3,438,410, and 3,930,310. The advantage of gear-wheel drive is that it is very reliable and moreover slipping can be avoided. A decisive disadvantage, however, is that the wear between the gear-wheel and the annular saw blade is very great, particularly when sawing in concrete, metal and other materials with heavy wear, since it is impossible to prevent sawdust from getting into the gear-wheel.

The systems hitherto developed which are based on friction-based transmissions use one or more driving wheels which bear against the plane web of the saw blade with opposite support from an opposing wheel at the other side of the saw blade. Since the special field of application of annular saws is for sawing in concrete, car bodies and similar demanding connections, for which saw blades equipped with diamonds are used, water must be sprayed on the object which is being sawn, or on the saw blade, to cool the saw blade and the diamonds and to flush away the sawdust as far as possible. It has been found that this spraying with water drastically reduces the friction between the driving wheel and the saw blade as a result of the fact that a film of water is formed between the driving wheel and the web of the saw blade. With known friction-based systems, there have also been problems with the drive, when the resistance to sawing was very great, even when no spraying with water occurs. In order to improve the friction and hence the drive, the driving wheel has been covered with a wearing surface. This has not solved the problem of water planing, however, and moreover has quickly worn out. Another method of increasing the friction is to increase the pressure between the driving wheel and the saw blade. This has resulted in so much development of heat, however, that the blade bends and the bearings of the driving wheel are damaged.

DISCLOSURE OF INVENTION

The object of the invention is to offer an improved annular saw blade and a drive system for annular saws which is based on the friction principle but in which the above-mentioned disadvantages and the limitations in former friction-based drive systems for annular saws are eliminated.

More specifically, it is an object to offer an improved annular saw blade and a drive system for annular saws which gives a satisfactory drive power even with intensive flushing with water during the sawing and with strong resistance to sawing.

It is also an object of the invention to produce a drive system with long durability of the driving elements. At the same time, it is an object to offer a transmission which has a very simple construction and which is thus cheap to manufacture.

It is a further object to offer an annular saw blade which is adapted to the new drive system and which is simple to manufacture. It is also an object that the design of the annular saw blade should harmonize with the other elements in the transmission, which means, inter alia, that the wear which gradually occurs in the parts of the annular saw blade which are included in the transmission may be able to be compensated for.

Further it is also, according to a preferred embodiment of the invention, an object to design the new drive system such that the driving force which is applied to the annular saw blade is increased when the sawing resistance is increased, but at the same time such that the driving force movementarily may be interrupted, if the saw blade tends to fasten or to seize.

These and other objects of the invention can be achieved as a result of the fact that the inner edge portion of the annular saw blade is bevelled—preferably symmetrically bevelled—to comprise encircling bevelled surfaces and in that mounted on the drive shaft of the annular saw are two drive rollers of which the surfaces adjacent to one another are bevelled at a certain bevel angle so that the rollers come to comprise drive surfaces which between them form a wedge-shaped groove, that the two lateral surfaces of the saw blade are bevelled in a corresponding manner in a region close to the inner edge of the saw blade, the angle of bevel being the same as for the drive rollers, and that the bevelled edge portion of the annular saw blade is clamped between the bevelled drive surfaces of the drive rollers in the wedge-shaped groove.

Further advantages together with characteristics and aspects of the invention will be apparent from the following description of a preferred form of embodiment and the following patent claims.

BRIEF DESCRIPTION OF DRAWINGS

In the following description of a preferred form of embodiment of the invention, reference is made to the accompanying Figures of the drawing of which FIG. 1 constitutes a perspective view of an annular saw according to the invention, FIG. 2 constitutes a perspective view of the saw, a cover included in the saw being shown in the folded-up position.

BEST MODE OF CARRYING OUT THE INVENTION

Figure 1:
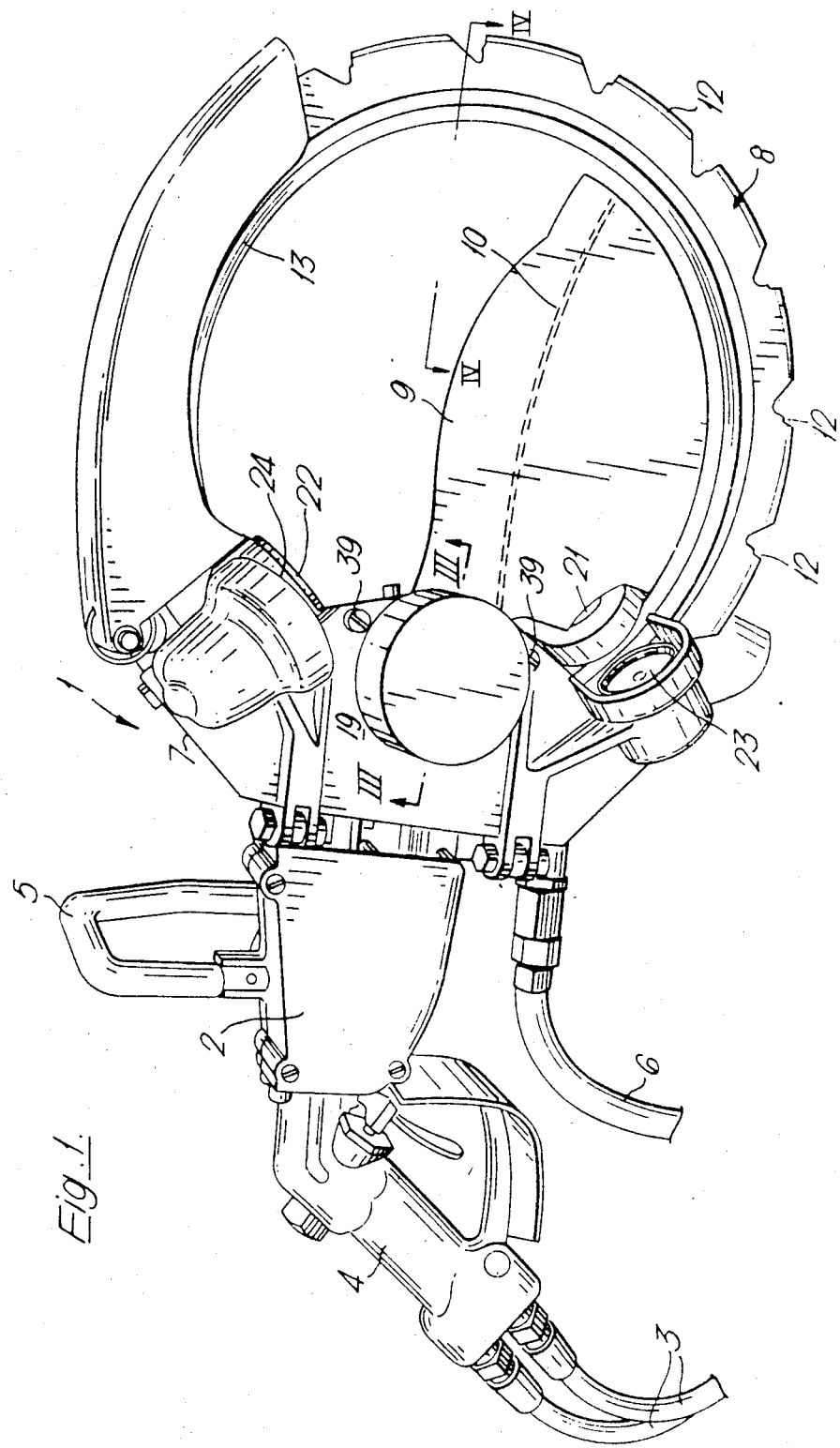

Referring first to FIG. 1, the motor housing of a hydraulically driven annular saw 1 is designated in general by the numeral 2. The hydraulic pipes are designated by 3. The motor housing 2 is provided with a pair of handles 4 and 5. A flushing water pipe is designated by 6. Mounted on the motor housing 2 is a unit 7 which includes elements for holding the annular saw blade 8 firmly and transmission members for driving the saw blade. A centre disc is designated by 9. This contains a passage 10 to convey flushing water from the pipe 6 via passages not shown in the unit 7 to the far end of the centre blade. The passage 10 is preferably designed in accordance with EPC Application No. 81.101511.4.

Figure 4:
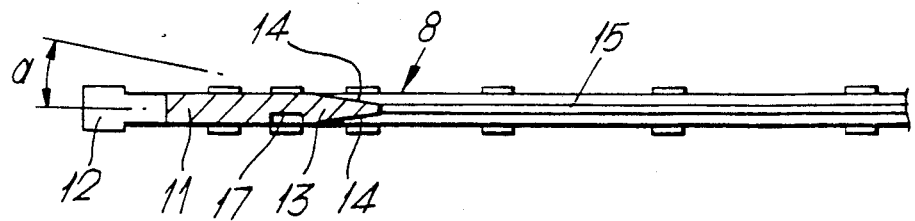
FIG. 4 shows, in a corresponding manner, section IV—IV through a saw blade according to the invention.

The design of the saw blade 8 is shown in more detail in FIG. 4. Thus the saw blade 8 consists of a web 11 and segment 12 equipped with diamonds, as well as an inner, narrowing edge region 13. The bevelled edge surfaces in the region in front of the edge portion 13 are designated by 14, while the inner, narrow edge is designated by 15. A circular groove 17 has also been formed at one side of the web in the web 11 of the saw blade.

The main parts of the unit 7 consist of a base plate 18 united to the motor housing 2 and a cover 19 which is mounted on the base plate 18 via a joint 20 so that the cover 19 can be folded up when the saw blade 8 is to be mounted or replaced. Mounted in the base plate 18 are a pair of lower running rollers 21 and 22, FIG. 1, adapted to support the saw blade from below in a manner known per se, and at the sides by engagement in the lower groove 17 and against the inner edge 15. Further mounted in the cover 19 is a pair of upper running rollers 23 and 24, FIG. 1, adapted to support the saw blade from above by pressing against the web 11 of the saw blade 8 directly opposite the corresponding running rollers 21, 22 in the base plate 18 at the under side of the saw blade.

Figure 2:
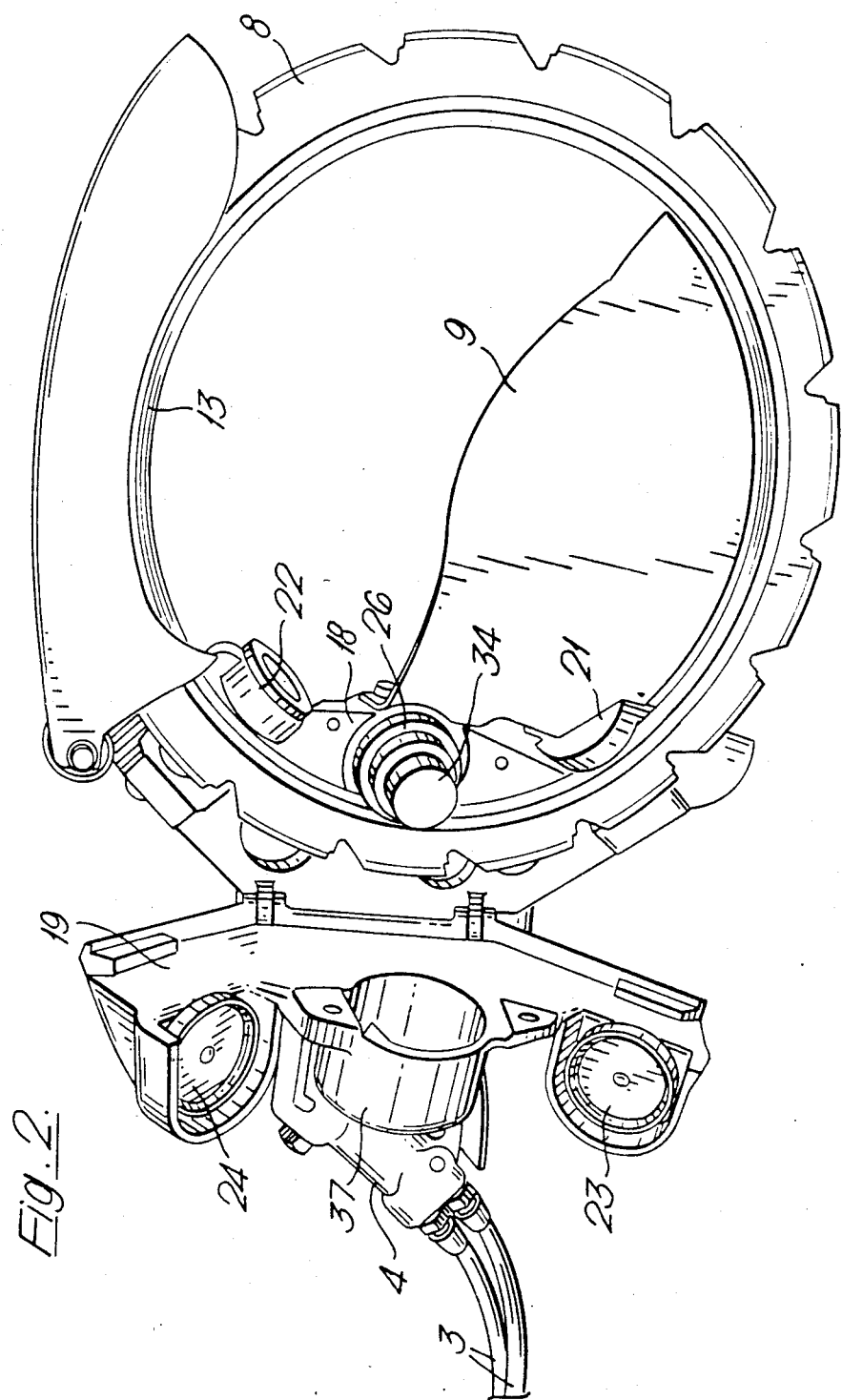

Apart from by means of the running rollers 21, 22, 23 and 24, the saw blade 8 according to the invention is held by a lower and an upper drive roller 25 and 26 respectively, FIG. 2. The drive rollers 25, 26 have a drive spindle 27 disposed in front of the inner edge 15 of the saw blade 8. The spindle 27 is parallel to the imaginary centre axis of the saw blade 8, that is to say perpendicular to the plane of symmetry of the saw blade 8. In order to drive the spindle 27, a V-belt transmission 28 with a V-belt 29 and a V-belt pulley 30 is disposed below the base plate 18. The V-belt 29 is driven by the hydraulic motor in the motor housing 2. The drive spindle 27 is mounted in a bearing 31, shown diagrammatically, in the base plate 18 and extends with a threaded journal 32 up into the lower, internally threaded drive roller 25. The latter comprises a sleeve-shaped portion 33 which extends upwards from the journal 32. The upper drive roller 26 is mounted round the sleeve 33 and can be displaced in relation to this. The assembly is held together by a cup 34 with a centre pin 35 which is screwed into the sleeve 33. A helic spring 36 is disposed between the cup 34 and the upper drive roller 26 so that this is pressed down against the saw blade 8 and the drive roller 25, but without coming completely into contact with the latter.

The upper end 43 of spring 36 is bent upwards and secured into a boring 44 in the cup 34, while the lower end 45 of spring 36 is bent downwards and secured in a boring 46 in the upper drive roller 26. Further the helic spring 36 is wound in the same direction as the direction of rotation of the saw blade 8, which means in a direction such that the spring 36 is stretched if the sawing resistance is increased, which in turn means that the downward force developed by spring 36 upon the upper drive roller 26 and hence also the pressure developed by the upper drive roller upon the bevelled edge portion 13 of the saw blade 8 is increased correspondingly.

The cover 19 is provided with a cap 37 which contains the drive rollers 25, 26 described and associated coupling elements. The centre blade 9 is mounted on the base plate 18 by means of screws 38 but may also be made movable to act as a protection against pinching in known manner.

Figure 3:
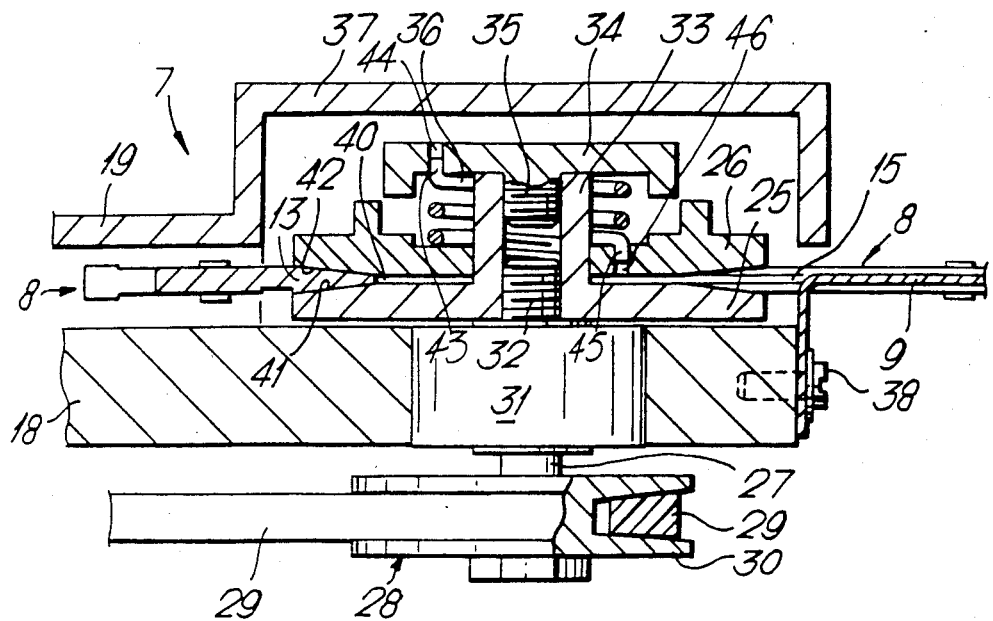
FIG. 3 shows, partially diagrammatically, a section II—II in FIG. 1.

When the saw blade 8 is to be mounted in the sawing machine 1, the screws 39 or corresponding coupling elements which are adapted to be able to press the cover 19 against the base plate 18 are first loosened. Then the cover 19 and with it the upper running rollers 23 and 24 are folded up by turning about the joint 20, FIG. 2. The saw blade 8 can now be inserted behind the drive rollers 25, 26 and then be pulled out towards the imaginary centre of the saw blade, that is to say to the right with reference to FIG. 2 and FIG. 3. In the course of this, the edge portion 13 of the saw blade is pressed into the wedge-shaped groove 40 between the bevelled surfaces 41 and 42 of the drive rollers 25 and 26 respectively. The surfaces 41 and 42 have the same angle of inclination as the edge surfaces 14 of the saw blade. The angle of inclination a amounts to between 2° and 15°, preferably to between 3° and 10°. 6° has proved to be a suitable angle. When the edge portion 13 of the saw blade has been pressed into the wedge-shaped groove 40 in this manner, the upper drive roller 26 is pressed upwards somewhat with opposition from the spring 36. The edge portion 13 of the saw blade is pressed so far into the wedge-shaped groove 40 that the lower running rollers 21 and 22 strike against the inner edge 15 of the saw blade and snap into the groove 17 at the under side of the web 11 with their guide flanges, not shown. After this, the cover 7 is folded down again and screwed fast, the upper running rollers 23 and 24 being lowered and brought to bear against the upper side of the web 11 directly opposite the lower supporting rollers 21 and 22.

The saw blade 8 thus mounted can now be rotated by means of the V-belt transmission 28 via the drive spindle 27 and the drive rollers 25 and 26. The pressure between the drive rollers 25 and 26 against the edge portion 13 of the saw can be considerable without the saw blade warping. As a result of the powerful contact pressure, which is maintained with the aid of the spring 36, a high friction is obtained between the bevel surfaces 14 on the saw blade and the bevel surfaces 41 and 42 on the drive rollers 25 and 26 respectively, so that no slipping occurs even with powerful spraying with water. Nor does the heating, which is obtained, result in harmful deformation because the contact area between the saw blade and the driving elements is comparatively small, so that the heat can be rapidly conveyed away through the web of the saw blade. The helic spring 36 also makes the operation of the saw blade smooth, and this has particularly importance in the initial engagement of the saw blade to a work piece and also when the saw blade is subjected to heavy resistance from the work piece. If however the saw blade would operate very uneven in the sawing groove causing momentary slipping between the bevel surfaces 14 on the saw blade and the bevel surfaces 41 and 42 on the drive rollers 25 and 26, the helic spring 36 will spring back to its initial position wherefrom it may facilitate a smooth restart of the transmission of driving power to the saw blade. The spring 36 also compensates for where in the power transmission such that when the saw blade and the drive rollers 25 and 26 become worn at the contact surfaces 14, 41 and 42, the upper drive roller 26 is pressed down by means of the spring 36 towards the lower drive roller 25.

I claim:

1. An annular saw blade with an axis and a plane of symmetry substantially perpendicular to said axis having an inner edge portion; an outer edge portion and a web having a flat top surface substantially parallel to said plane of symmetry and a flat bottom surface substantially parallel to said plane of symmetry connecting the inner and outer edge portions, said inner edge portion being symmetrically beveled to comprise encircling bevel surfaces having a bevel angle with respect to said plane of symmetry, said outer edge portion provided with cutting means, and an annular groove is provided only on one of said top surface and said bottom surface of said web, said groove being radially displaced from said bevel surfaces and said cutting means, said encircling bevel surfaces and said substantially flat top and bottom surfaces meeting along respective circumferential lines at an angle equal to 180° minus the bevel angle in relation to the plane of symmetry of the saw blade.

2. An annular saw blade as claimed in claim 1, wherein said bevel surfaces have a bevel angle in relation to the plane of symmetry of the saw blade of between 2° and 15°.

3. An annular saw blade as claimed in claim 1, wherein said bevel surfaces have a bevel angle in relation to the plane of symmetry of the saw blade of between 3° and 10°.

* * * * *